US008040013B2

(12) United States Patent  
Parmeter

(10) Patent No.: US 8,040,013 B2  
(45) Date of Patent: Oct. 18, 2011

(54) ELECTRIC SUBMERSIBLE PUMP (ESP) HAVING A MOTOR WITH MECHANICALLY LOCKED STATOR LAMINATIONS

(75) Inventor: Larry J. Parmeter, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 489 days.

(21) Appl. No.: 11/972,458

(22) Filed: Jan. 10, 2008

(65) Prior Publication Data

US 2009/0195117 A1 Aug. 6, 2009

(51) Int. Cl.
H02K 1/16 (2006.01)
(52) U.S. Cl. .................................. 310/216.129; 310/89
(58) Field of Classification Search ........... 310/216.007, 310/128, 129, 131, 114, 418, 422, 427, 432, 310/254, 89
See application file for complete search history.

(56) References Cited

U.S. PATENT DOCUMENTS

| 1,820,531 | A | * | 8/1931 | Engelhardt | ............ | 310/216.131 |
| 2,424,443 | A | * | 7/1947 | Evans | ..................... | 310/216.129 |
| 3,048,116 | A | | 8/1962 | Konrad | | |
| 3,313,967 | A | * | 4/1967 | Ross | ............................. | 310/410 |
| 4,007,867 | A | | 2/1977 | Wielt et al. | | |
| 4,513,215 | A | | 4/1985 | Del Serra | | |
| 4,521,708 | A | | 6/1985 | Vandevier | | |
| 4,564,779 | A | * | 1/1986 | Terry, Jr. | ........................ | 310/433 |
| 4,577,128 | A | | 3/1986 | Gould et al. | | |
| 4,578,608 | A | | 3/1986 | Mech et al. | | |
| 4,603,273 | A | * | 7/1986 | McDonald | ...................... | 310/89 |
| 4,638,198 | A | | 1/1987 | Cochran | | |
| 4,745,320 | A | * | 5/1988 | Oyama et al. | .......... | 310/216.129 |
| 5,398,397 | A | * | 3/1995 | Johnson | ......................... | 29/596 |
| 5,534,736 | A | * | 7/1996 | Johnson | ......................... | 310/91 |
| 6,133,666 | A | | 10/2000 | Hollenbeck et al. | | |
| 6,225,719 | B1 | | 5/2001 | Hallundbaek | | |
| 6,407,474 | B1 | * | 6/2002 | Mahn et al. | ..................... | 310/89 |
| 6,634,081 | B2 | | 10/2003 | Kohler et al. | | |
| 6,700,252 | B2 | | 3/2004 | Fleshman et al. | | |
| 6,794,788 | B1 | | 9/2004 | Smith et al. | | |
| 6,969,940 | B2 | | 11/2005 | Dalrymple et al. | | |
| 7,062,841 | B2 | | 6/2006 | Neuenschwander | | |
| 7,168,486 | B2 | | 1/2007 | Hackworth et al. | | |
| 2007/0096571 | A1 | | 5/2007 | Yuratich | | |

FOREIGN PATENT DOCUMENTS

| JP | 2002027688 | 1/2002 |
| JP | 2005198422 | 7/2005 |
| JP | 2007189783 | 7/2007 |

* cited by examiner

*Primary Examiner* — Quyen Leung  
*Assistant Examiner* — Naishadh Desai  
(74) *Attorney, Agent, or Firm* — Bracewell & Giuliani LLP

(57) ABSTRACT

A submersible pumping system for use downhole, wherein the system includes a pump and a pump motor for driving the pump. The pump motor includes a housing with corresponding stator and rotor lamination stacks disposed within the housing. Also included with the pump motor is an anchoring system for axially securing the stator lamination stack within the motor housing.

13 Claims, 3 Drawing Sheets

ELECTRIC SUBMERSIBLE PUMP (ESP) HAVING A MOTOR WITH MECHANICALLY LOCKED STATOR LAMINATIONS

BACKGROUND

1. Field of Invention

The present disclosure relates to downhole pumping systems submersible in well bore fluids. More specifically, the present disclosure concerns axially stabilizing submersible pump stators with mechanical anchoring.

2. Description of Prior Art

Submersible pumping systems are often used in hydrocarbon producing wells for pumping fluids from within the wellbore to the surface. These fluids are generally liquids and include produced liquid hydrocarbon as well as water. One type of system used in this application employs an electrical submersible pump (ESP). ESPs are typically disposed at the end of a length of production tubing and have an electrically powered motor. Often, electrical power may be supplied to the pump motor via a power cable. Typically, the pumping unit is disposed within the well bore just above where perforations are made into a hydrocarbon producing zone. This placement thereby allows the produced fluids to flow past the outer surface of the pumping motor and provide a cooling effect.

FIG. 1 provides in side view an electrical submersible pump (ESP) system used for the production of wellbore fluids produced from a hydrocarbon borehole. Here, the ESP system 20 is shown disposed in a wellbore 5, where the wellbore 5 is lined with casing 11. The wellbore 5 is formed through a formation 7 and intersects a hydrocarbon producing zone. Perforations 9 are formed through the casing 11 and into the surrounding formation 7, thereby allowing for hydrocarbons entrained in the formation 7 to enter into the wellbore 5. A produced hydrocarbon, is shown exiting the perforations 9 and into the wellbore 5 as arrows A. The ESP system 20 comprises a pump motor 22 at its lowermost section. Adjacent the pump motor 22 is the seal section 24. The seal section 24 is responsive to ambient pressure and transfers the ambient pressure to the internal portions of the pump system thereby substantially equalizing pump system internal pressure with ambient to minimize the pressure differential across the pump system seals. A fluid inlet 26 is provided on a gas separator 28 and configured to receive wellbore production fluid therein for delivery to the pump 29. The pressurized wellbore fluid exiting the pump 29 flows into production tubing 30 for delivery to the surface where is then transmitted for further refinement. Gas removed in the separator is typically discharged from the pumping system and back into the wellbore where it flows to the wellhead.

Motors for electrical submersible pump systems are typically formed by stacking a series of stator laminations inside a pump motor housing. Grooves are formed within the housing at the top and bottom terminal ends of lamination stack. The grooves are configured to receive a snap ring, where the snap ring inner diameter extends into the pump motor from the housing inner diameter. Forming the motor typically comprises inserting the snap ring located at the bottom of the housing, then adding the lamination stack within the housing. The laminations are then compressed, with a press or some other mechanical device; while the laminations are still under compression the stop snap ring is inserted. After the pressure on the lamination stack is released, the stack will slightly spring back and exert an axial force on both top and bottom snap rings, where the opposing force is in opposite directions. This force on the snap rings will slightly stretch the housing along its length. The residual force in the lamination stack and the snap rings locks the laminations into place thereby preventing lamination spin during motor operation.

The ESP pump motors also comprise a rotor attached to a pump motor shaft. The rotor also consists of corresponding rotor laminations. The stator lamination stack and the rotor lamination stack include openings that axially run along the length of the motor, wherein the openings contain wires, or other electrical conducting elements that form corresponding coils in each of the rotor and stator lamination stack. Typically the coil in the stator lamination stack is energized to form an electrical field that through electromagnetic forces produces a rotation in the rotor stack and thus correspondingly rotates the pump motor shaft.

SUMMARY OF INVENTION

The present disclosure includes an electrical motor comprising a motor housing, a stack of stator laminations coaxially disposed in the housing, an axially extending groove formed on an outer diameter of the stack, a strip extending along the groove coupling the laminations of the stack, and a locking coupling affixed to the housing and in coupling engagement with the strip. The locking coupling may comprise a ring coaxially disposed in the housing and having a tab extending perpendicular to the ring axis into locking engagement with the groove. The ring may optionally be affixed to the housing. The locking coupling may comprise corresponding lock ring assemblies respectively disposed on the upper and lower ends of the lamination stack, tabs extending from the lock ring assemblies into locking engagement with the groove, wherein the strip extends between the respective terminals ends of the tabs.

Also disclosed herein is a method of constructing a motor for a submersible pumping system comprising, providing a cylindrical housing with a bore, affixing an anti-rotational locking device within the bore of the housing, and disposing a stator lamination stack within the housing into locking engagement with the locking device, wherein engaging the stator lamination stack with the locking device axially locks the stator lamination within the housing.

The present disclosure further includes an electrical motor for a submersible pumping system comprising, a cylindrical housing having a bore, a stator lamination stack disposed within the housing, the stack comprising stator laminations, a longitudinally extending groove formed in the stator lamination stack, a strip insertable into the bore through the groove, and locking rings anchored within the bore of the housing, against rotation, each locking ring having a tab engaging the groove; wherein the strip extends between the tabs.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be through and complete, and will fully convey the scope of the invention to those skilled in the art. Like numbers refer to like elements throughout.

Figure 1:
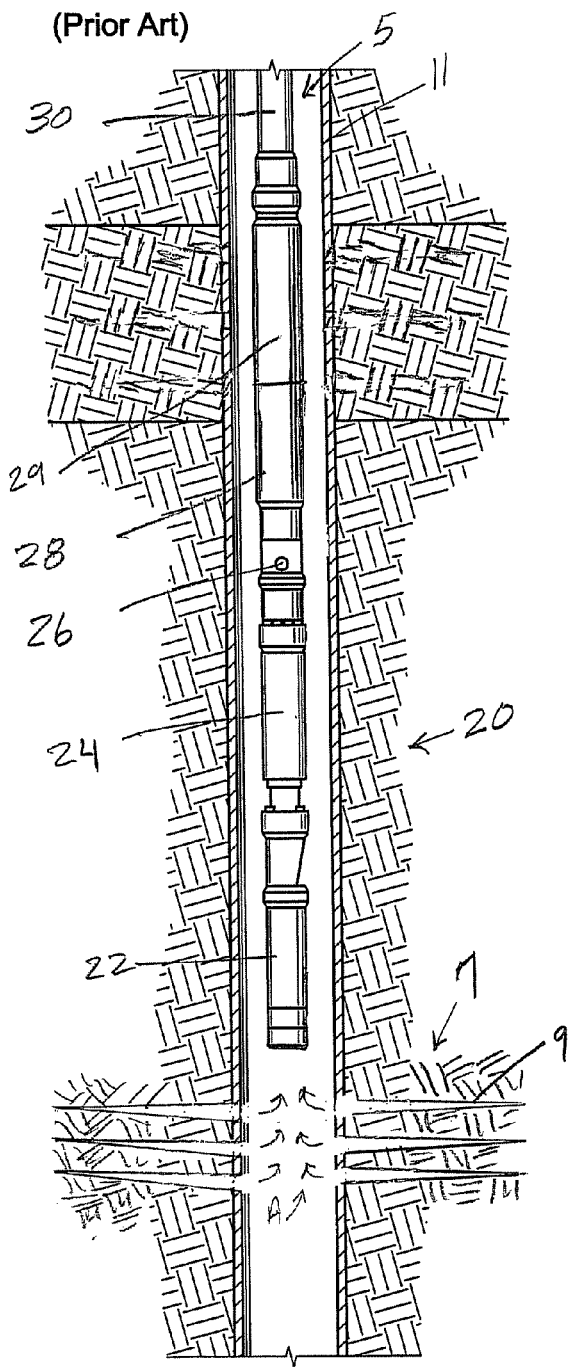
FIG. 1 is a side view of a downhole submersible system in accordance with the present disclosure.
Figure 2:
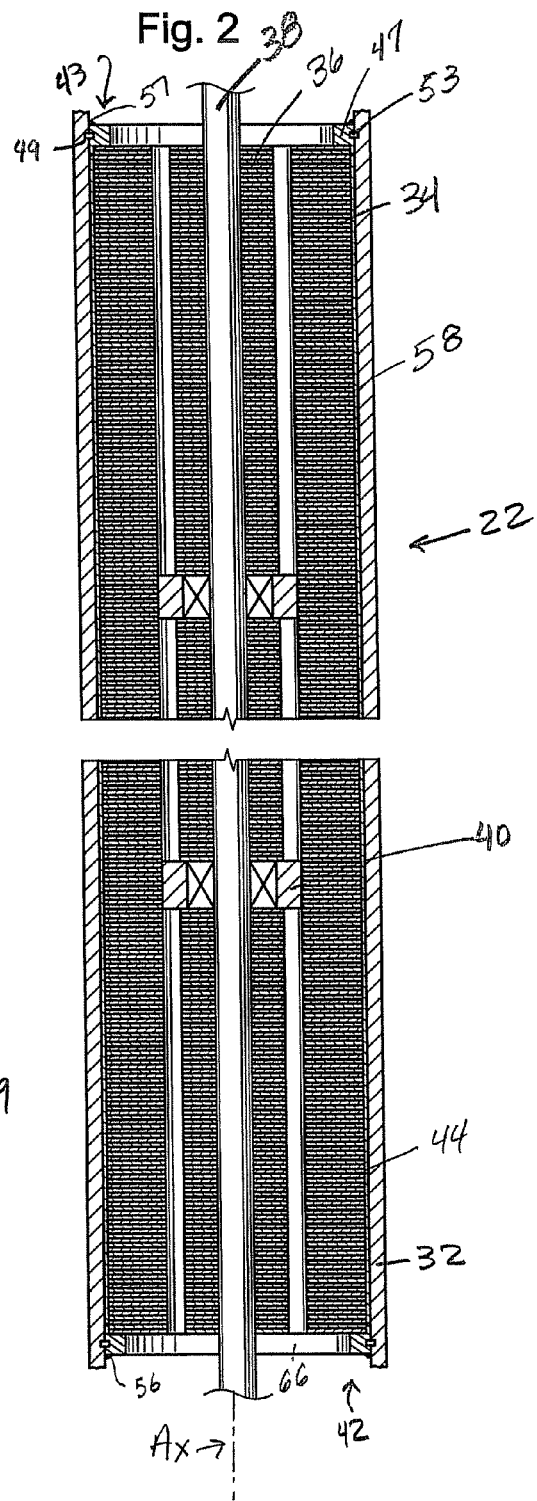
FIG. 2 provides in a side cross sectional view a portion of a motor of an electrical submersible pump.

FIG. 2 is a side cutaway view of a portion of a pump motor in accordance with the present disclosure. The pump motor 22 comprises a generally cylindrical housing 32 with a stack of stator laminations 34 stacked along a portion of the housing 32 inner diameter. This lamination stack 34 is a generally annular member, and its outer diameter is in contact with the inner diameter of the housing 32. A rotor stack 36 and pump shaft 38 combination are located within the inner diameter of lamination stack 34. The pump shaft 38 extends through the pump motor 32 and is generally aligned along the axis $A_X$ of the housing 22. In the embodiment shown, the housing 22 inner diameter is generally smooth and without grooves or raised portions thereon. The rotor lamination stack 36 is attached to the shaft 38, such that rotation of the rotor stack 36 necessarily produces corresponding rotation of the shaft 38. Bearings 40 having a generally annular body have an outer diameter in contact with the inner diameter of the stator lamination stack 34 and an inner diameter coupled with the outer diameter of the shaft 38. Bearings 40 reduce frictional rotation of shaft 38 and also align the shaft 38 within the housing 22. Corresponding coils are formed within the stator lamination stack 34 and when energized cause shaft 38 rotation for driving an associated pump.

A lock ring assembly 42 is illustrated for anchoring the stator lamination stack 34 within the housing 32. In the embodiment shown the lock ring assembly 42 is provided at both the top and bottom of the lamination stack 34. However, the scope of the present disclosure includes pumping systems having a single lock ring assembly. The lock ring assembly 42 mechanically couples with one or more of laminations 44 that make up the stator lamination stack 34. This mechanical coupling prevents axial rotation of those particular laminations with respect to the lock ring assembly 42. As shown also in FIG. 3, a strip 58 is located on the outer edge of the stack 34 extending along the length of the stack 34. In this embodiment, the strip 58 is a thin band that resides within a groove formed by individual notches located at a particular radial position on the edge of the individual laminations 44. The lock ring assembly 42 is attached to the housing 32, which prevents its axial rotation within the housing, thereby preventing seal rotation of the stack 34.

Figure 3:
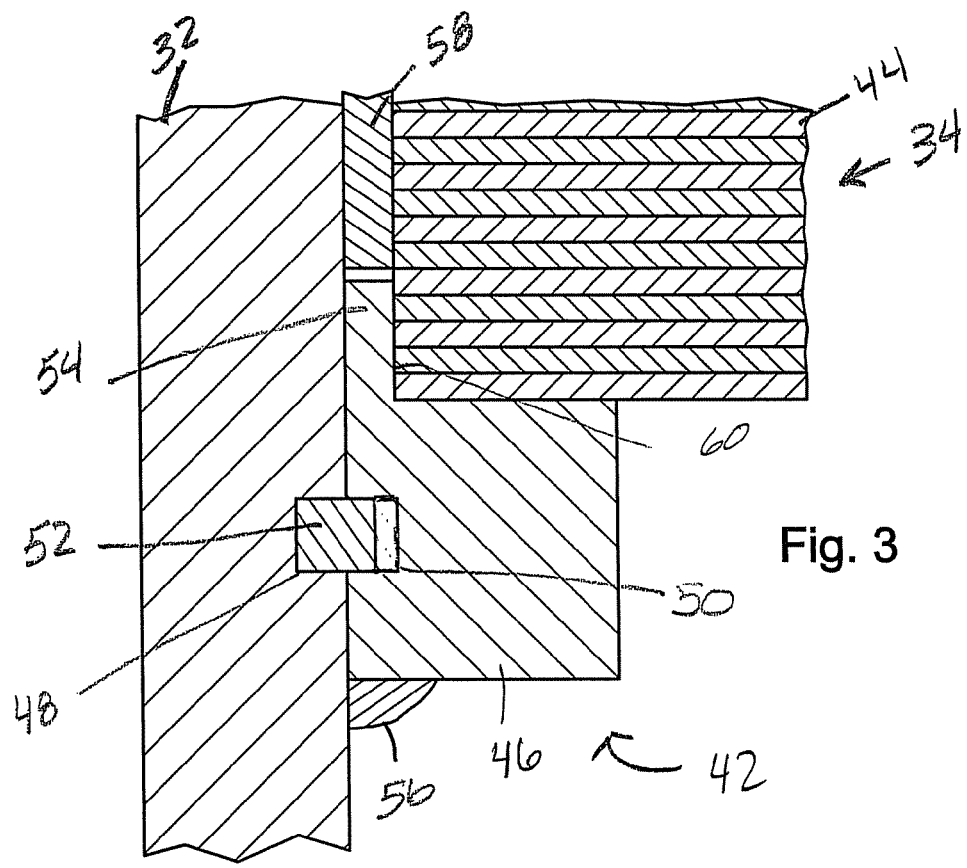
FIG. 3 is a side cross sectional view of a section of an electrical submersible pump motor having an embodiment of a lock ring.

FIG. 3 is a vertical cross-sectional view of an embodiment of a long ring assembly 42. The lock ring assembly 42 comprises a lock ring 46 which is a ring-like structure whose outer edge contacts the inner diameter of the housing 32. A snap ring 52 is shown residing within corresponding channels (48, 50) formed within the inner diameter of the housing 32 and the outer diameter of the lock ring 46. The combination of the snap ring 52 within the channels (48, 50) anchors the lock ring 46 at a set longitudinal position with the housing 32.

Figure 4:
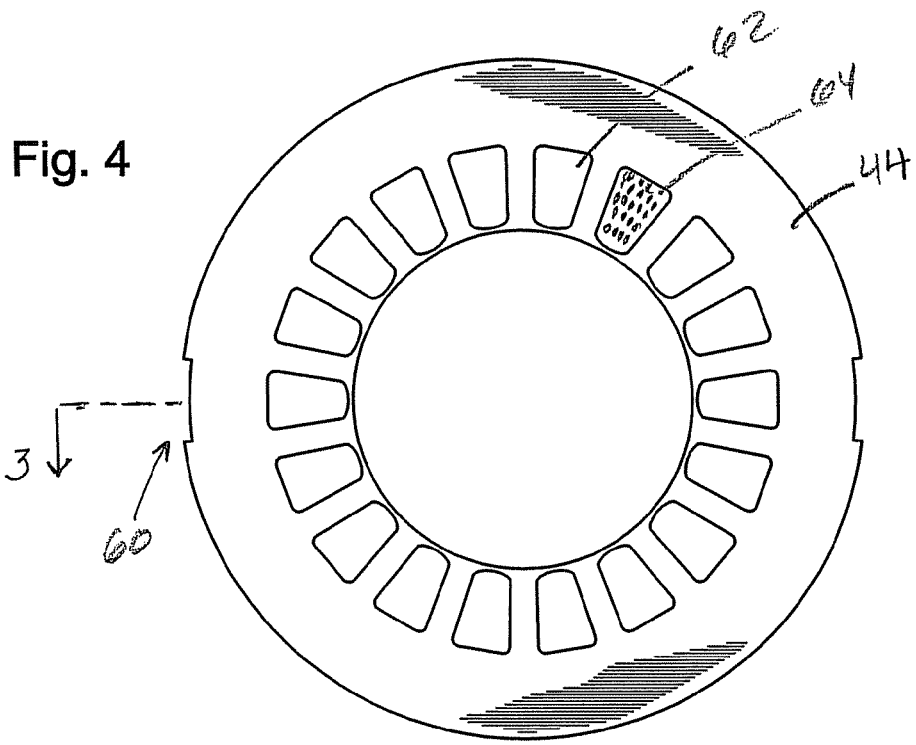
FIG. 4 is an overhead view of an example of a stator lamination.

With reference now to FIG. 4 an overhead view of an individual lamination 44 is shown having a notch 60 formed at a portion along its outer periphery. The lock ring 46 includes a tab 54 formed to extend from the main body of the lock ring 46 and along the inner diameter of the housing 32 into locking and coupling attachment with the insert 60. As noted above, the lock ring assembly 42 is securable to the housing 32. In the embodiment of FIG. 3, the attachment is provided via a weld 56 between the lock ring 46 and the housing 32. However, other means of attachment may be employed for securing the lock ring assembly 42 within the housing 32 of the pump assembly.

Also illustrated in FIG. 4 are the slots 62 formed axially through the body of each lamination 34. Electrical conductors, such as wires 64 are extended through the lamination stack 34 and through the aligned slots 62. Wires 64 form a coil within the stator lamination stack 34.

Figure 5:
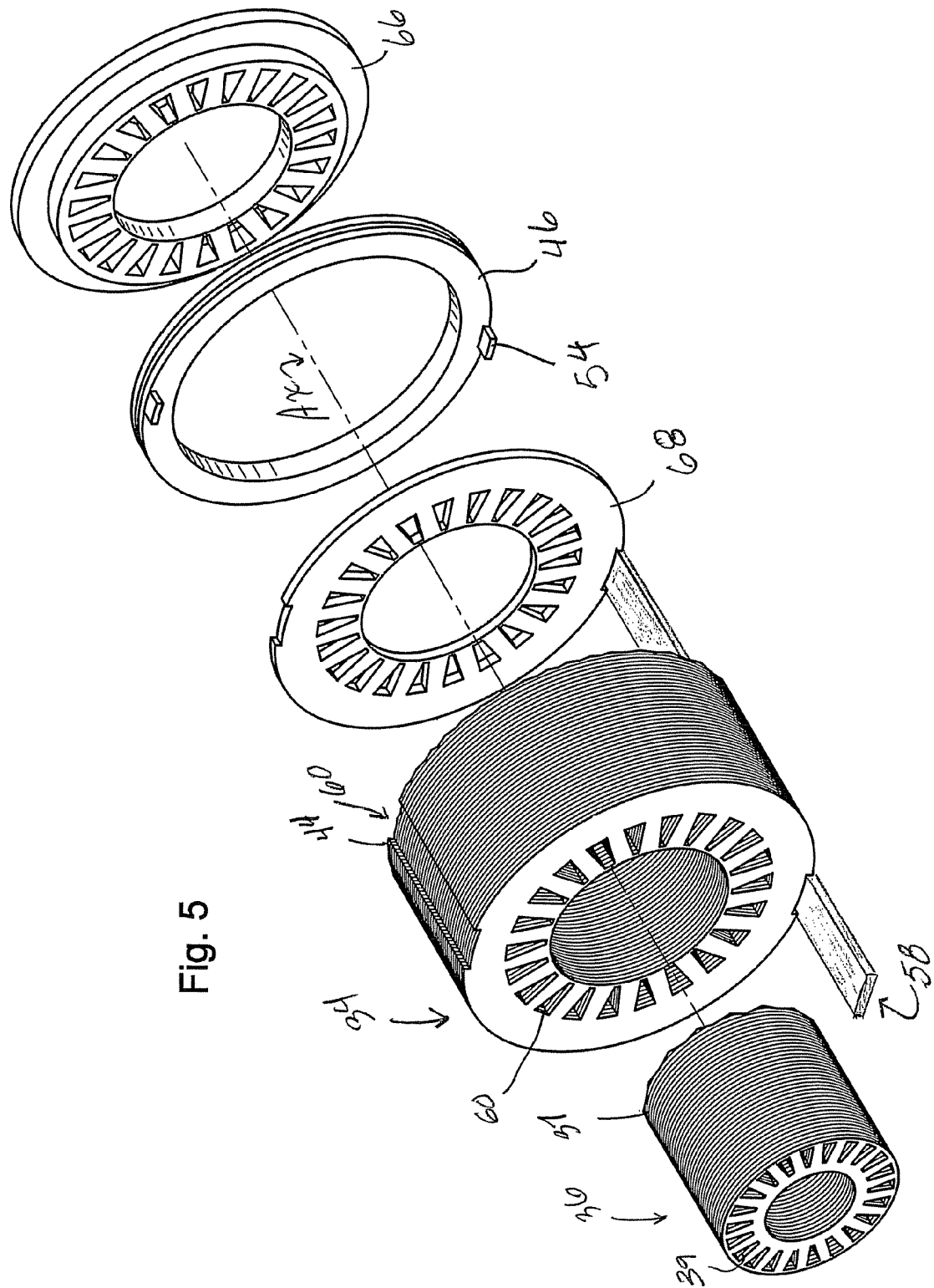
FIG. 5 is an exploded view of a portion of an embodiment of an electrical submersible pump motor having a stator locking ring.

FIG. 5 is an exploded perspective view of portions of a pump motor for an ESP in accordance with the present disclosure. In this embodiment the components of the pump motor are shown generally co-axially aligned with respect to the housing axis $A_X$. In perspective view, the rotor stack 36, comprising individual rotor laminations 37, is illustrated and in co-axial alignment for insertion within the stator lamination stack 34. Instead of coils, the rotor laminations 36 include electrically conducting rods (not shown) disposed into respective slots 39.

An embodiment of the lock ring 46 with its respective tabs 54 extending perpendicular to the plane of the lock ring 46 and generally parallel to the housing axis $A_X$. The tabs 54 may range in length from 0.25 inch to in excess of 1 inch, in one embodiment the length is approximately 0.5 inch. The tabs 54 on the lock ring 46 may be staggered and thus range in size with respect to one another. Staggering tab 54 length can ensure that at least one of the tabs 54 are in full engagement with a corresponding stator lamination 44.

The strip 58 is shown extended through the elongated slot formed by individual notches 60 on the outer periphery of the laminations malting up the lamination stack 34. Preferably, the strip 58 extends along the entire length of the lamination stack 34 and terminates at the upper and lower locking ring assemblies (42, 43). However, other embodiments exist where the strip 58 extends along only a portion of the lamination stack 34. The strip 58 may be comprised of single element or multiple elements disposed within the slot on the outer periphery of the lamination stack 34. And although shown as having a generally rectangular cross-section, the strip 58 may have other cross-sectional shapes such as square, circular or other known configurations.

Optionally, the upper and lowermost laminations of the lamination stack 34 may comprise an end lamination 68, wherein the end lamination 68 is strengthened either by added cross-sectional mass and area or through material strength by a material choice. One of the advantages of a strengthened end lamination 68 is realized during compression of the lamination stack, wherein deflection of the end lamination is reduced due to the compressive forces of forming the lamination stack. Optionally, an end cap 66 may be attached on the outermost section of the lamination stack that provides a protective covering for the elements of the coil that may be exposed on the respective outer ends of the stack. The end cap 66 is preferably formed from an elastomeric material that may be fixed or removed easily.

In one example of forming a pump motor assembly in accordance with the present disclosure, a lock ring 46 is coupled to a lower end of the housing 32 with a snap ring 52. Prior to the inserting the lock ring 46 to the housing 32, the snap ring 52 is placed and compressed into the channel 50 formed on the outer circumference of the lock ring 46. The lock ring 46 is then coaxially slid into the housing 32 until the respective channels (48, 50) are aligned thereby allowing the snap ring 52 to expand into the channel 48 formed in the housing 32. The dimensions of the snap ring 52 allow it to simultaneously extend into both channels (48, 50) thereby axially affixing the lock ring 46 within the housing 32. The lamination stack 34 is then inserted into the upper end of the housing 32 and the notches 60 are aligned and engaged with the tabs 54 upwardly extending from the lock ring 46. The strips 58 can be inserted into the slot before or after the lamination stack 34 is placed into the housing 32. The strips 58 may comprise a single element extending along the lamination stack 34, or multiple shorter strips placed in series in the groove. Optionally the strips 58 are glued into the grooves prior to placing the stack 34 in the housing 32.

An upper lock ring 47 with a corresponding snap ring 53 is inserted into the housing 32 upper end. The lamination stack 34 is then compressed until the snap ring 53 engages a channel 49 formed on the upper portion of the housing 32, which axially affixes the upper lock ring 47 to the housing 32. After snap ring 53 engagement the compressive pressure is released thereby allowing the lamination stack 34 to slightly expand thereby stretching the housing 32 through its axial connection with the snap rings (52, 53) and lamination stack 34. The snap rings (52, 53) however do not prevent rotation of the lock rings (46, 47), the lock rings (46, 47) may be axially anchored with welds (56, 57) securing the lock rings (46, 47) to the housing 32. Other means may be employed for axially anchoring the lock ring, such as outwardly extending tabs (not shown) bolted to the housing 32. Thus the stator lamination stack is prevented from axial rotation within the housing by a combination of lock ring assemblies welded to the housing and inwardly extending tabs that mate with notches formed on the laminations.

Lamination stacks for use with the present disclosure may range in length from about 5 feet to about 35 feet. The diameter of such a lamination stack can range from around 3.00 inch to around 9.00 inch. The present disclosure may be used on pump motors whose power ranges from about 150 horsepower to about 4000 horsepower, the pump motor power may also be in the range of about 200 horsepower to about 3000 horsepower.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. For example, the location of the notches is not limited to the stator lamination outer peripheries, but may be formed through the body of the stator laminations. Accordingly, the invention is therefore to be limited only by the scope of the appended claims.

The invention claimed is:

1. An electrical motor comprising:
   a motor housing;
   a stack of stator laminations coaxially and fully disposed in the housing;
   an axially extending groove formed on an outer diameter of the stack;
   a strip extending along the groove coupling the laminations of the stack, the strip being fully enclosed within the housing between the outer diameter of the stack and an interior side wall of the housing; and
   a locking coupling affixed within the housing and in coupling engagement with the strip to prevent rotation of the stator within the housing.

2. The motor of claim 1, wherein the locking coupling comprises a locking ring coaxially disposed and non rotatably secured within the housing, the locking ring having a tab extending perpendicular to the ring axis into locking engagement with an end of the groove.

3. The motor of claim 1, wherein the locking coupling comprises a locking ring is welded to the interior side wall of the housing.

4. The motor of claim 1, wherein: the housing extends continuously from a first end to a second end of the motor; the housing has an interior cylindrical side wall that is free of any axially extending grooves.

5. The motor of claim 1, wherein the strip has a thickness that is not greater than a radial depth of the groove.

6. The motor of claim 1, wherein the locking coupling comprises corresponding lock ring assemblies secured within the housing and respectively disposed on the upper and lower ends of the lamination stack, and tabs extending from the lock ring assemblies into locking engagement with upper and lower ends of the groove, wherein the strip extends between the respective terminals ends of the tabs.

7. The motor of claim 6, further comprising an end cap within the housing engagement with upper and lower ends of the stack, with one of the ring assemblies located between one of the end caps and the upper end of the stack and the other of the ring assemblies located between the other of the end caps and the lower end of the stack.

8. The motor of claim 2, further comprising a snap ring secured within an annular recess formed in an interior side wall of the housing, the snap ring being in abutment with the locking ring to axially retain the locking ring in the housing.

9. An electrical motor for a submersible pumping system comprising:
   a cylindrical housing having a bore, the housing having a first end potion and a second end portion and extending continuously from the first end portion to the second end portion;
   a stator lamination stack disposed within the housing, the stack comprising stator laminations, the stack having a first end in the first end portion of the housing and a second end in the second end portion of the housing;
   a longitudinally extending groove formed in an outer diameter of the stator lamination stack, the groove extending continuously from the first end to the second end of the stack;
   a strip insertable into the bore through the groove, the strip being located between a side wall of the housing and the stack, the strip extending continuously from the first end of the stack to the second end of the stack;
   first and second locking rings anchored within the bore of the housing against rotation, each locking ring having a tab engaging the groove, the first locking ring being in the first end portion of the housing and the second locking ring being in the second end portion of the housing; and
   wherein the strip extends between the tabs.

10. The pumping system of claim 9 further comprising end caps within the housing on the ends of the stator lamination stack, the locking rings being located between the end caps and the stack.

11. The pumping system of claim 9, wherein the strip is slideable with respect to the housing.

12. The pumping system of claim 9, wherein the strip has a first end in substantial abutment with the tab on the first locking ring and a second end in substantial abutment with the tab on the second locking ring.

13. An electrical motor for a submersible pumping system comprising:
- a housing having a bore, the housing having a first end potion and a second end portion and extending continuously from the first end portion to the second end portion;
- a stator lamination stack fully disposed within the bore of the housing, the stack comprising stator laminations, the stack having a first end in the first end portion of the housing and a second end in the second end portion of the housing;
- a longitudinally extending groove formed in an outer diameter of the stator lamination stack, the groove extending continuously from the first end to the second end of the stack;
- a strip insertable into the groove and extending from the first end to the second end of the stack, the strip having a thickness not greater than a radial width of the groove, the strip having a width substantially equal to a width of the groove, the portion of the bore of the housing surrounding the stack being an uninterrupted cylindrical surface; and
- first and second locking rings anchored within the bore of the housing against rotation, each locking ring having a tab engaging an end of the groove, the first locking ring being in the first end portion of the housing and the second locking ring being in the second end portion of the housing.

* * * * *